United States Patent Office 3,224,903
Patented Dec. 21, 1965

3,224,903
DEXTRINS AND METHOD OF MAKING SAME
John D. Commerford, Crestwood, and Barrett L. Scallet, Clayton, Mo., and Grant T. Van Duzee, Minneapolis, Minn., assignors to Anheuser-Busch, Incorporated, St. Louis, Mo., a corporation of Missouri
No Drawing. Filed Mar. 7, 1963, Ser. No. 263,428
4 Claims. (Cl. 127—38)

This invention relates to dextrins and in particular to a series of low viscosity dextrins suitable for preparing high solids adhesives.

Amylaceous adhesives can be classified according to the degree of degradation of the parent starch. Cooked native starch forms a viscous paste at about 5% solids. The adhesive is slow setting, has poor tack and retrogrades. At the other end of the classification, canary dextrins can be used at 60–65% solids. These adhesives are much faster drying, have good tack and little tendency to retrograde. Unfortunately, the canary dextrins are more expensive, have an undesirable color in certain instances, have an undesirable taste, and form weaker bonds than less converted materials. Between these extremes are the fluidity starches, the oxidized starches and the white dextrins. These materials have properties intermediate to those of raw starch and canary dextrins. There is a certain amount of overlapping of these classes. For example, fluidity starches range from materials only slightly different from raw starch to materials similar to the mildly converted white dextrins. These materials have definite "starchy" characteristics, slow setting, retrograding, etc. The white dextrins range all the way from low soluble starch-like materials to high-solubles canary-like products.

A white dextrin is usually prepared by roasting acidified starch of about 7.5% moisture content for 2–6 hours at temperatures ranging from 220–300° F. HCl is usually used. The amount of HCl varies with the degree of conversion sought, the nature of the starch and the type of equipment employed. Thus in a typical steam jacketed batch reactor the acid may vary from about 2500 meq. HCl to about 6000 meq. HCl per 1000 lbs. starch depending on the type of product sought. The acid is generally added by spraying dilute HCl (1.5 to 2.0 N) onto the starch while it is tumbled in a mixer. After it has been thoroughly mixed it is dropped into a roaster equipped with a sweep blade agitator and heated at a scheduled rate to the prescribed temperature. Ordinarily heated air is passed through the roaster to remove excess moisture. If a large amount of acid has been added the temperature usually is kept relatively low to prevent color formation. Furthermore, the reaction is usually complete in about 2 hours. When low acid conversions are made, the temperatures can be higher and the time prolonged. Thus, a wide variety of products can be made by controlling acid, time and temperature.

Other methods of dextrinizing or converting starch have also been used. At one time acidified "bricks" of starch were placed on trays and roasted in a hot room. U.S. Patent No. 2,698,818 discloses a method of degrading starch under vacuum. U.S. Patent No. 2,845,368 discloses a method of dextrinizing starch in a fluidized bed. U.S. Patent No. 2,565,404 discloses a process of degrading starch under pressure. U.S. Patent No. 2,818,357 discloses a method of producing a dextrin in a heated vibrating spiral tube. In all of these methods starch is acidified and heated, and depending on the time, temperature and acid concentration, a particular degree of conversion is obtained. Each of the products has a unique set of properties.

One way of comparing the various changes in properties is to follow the degree of polymerization (D.P.) and the corresponding viscosity changes. The slight reductions in D.P. made by aqueous acid hydrolysis in the preparation of fluidity starches result in decreased viscosity of the cooked pastes. On standing, these pastes set-back (retrograde) to about the same extent as raw starch pastes. This has been attributed to a selective hydrolysis of the branched chain fraction of starch leaving the amylose free to form aggregates. (Hypochlorite oxidized starches have a less tendency to retrograde.) The acid converted dextrins start out in a manner similar to the fluidity starches, but as the conditions are made more drastic, a more homogeneous bond scission is obtained. Under these conditions, bond formation also is possible and eventually a state is reached when the degree of polymerization is not appreciably decreased. At this point a minimum viscosity is obtained, and, from this point on, further conversion will in general increase the degree of polymerization, darken the product and stabilize the viscosity (inhibit retrogradation). From a practical basis, this point of lowest viscosity is reached at about 90% solubles. (That is, when the filtrate obtained from the mixing of 10 grams of dextrin with 200 ml. water contains over 90% of the solids.) Using more drastic conditions, such as higher temperature, more acid, and longer reaction time, results in charring of the product, higher dextrose plus mechanical difficulties in the rate of removal of water, lumping, balling, speck formation, etc. Thus, for all practical purposes, the lowest viscosity possible for a given solids level has been limited to this type of product.

The new dextrins of the present invention overcome several of the disadvantages of present dextrins. The new dextrins have viscosities anywhere from 10 to 90% lower than heretofore possible; are white dextrins; have nearly 100% solubles; are free of the extremely acrid odor associated with highly converted products; and can be prepared in the same or less length of time as white dextrins of much higher viscosities.

One of the principal objects of the present invention is to prepare dextrins of very low viscosity.

Another object of the present invention is to provide materials which can be used to prepare very high solids adhesives.

Still another object of the present invention is to provide materials which have the solubility and tack characteristics of canary dextrins without having the dark color associated with canary dextrins.

A further object of the present invention is to provide dextrins which have decreased tendency to retrograde when made up into adhesives.

Another object of the present invention is to provide a method of making low viscosity dextrins wherein the acid and water concentrations are controlled during the roasting process.

Still another object of the present invention is to provide a method of making a high solubles white dextrin by adding water and acid in controlled amounts during critical stages of the roasting process.

These and other objects and advantages will become apparent hereinafter.

The present invention comprises a low viscosity white dextrin having an extremely high percentage of solubles. The present invention also comprises a method of making a dextrin including the step of maintaining the water and acid levels above predetermined figures during the critical stages of the roasting process. The invention further consists in the processes hereinafter described and claimed, the dextrins made by said processes, and the adhesives made from said dextrins.

As will be described in more detail in the description and examples which follow, in the present invention, starch, which has been acidified and partially dextrinized, is treated with additional water and acid so as to maintain the acid concentration and moisture content at a higher than normally obtainable level during the critical period of the roasting when rapid degradation of the starch is taking place. This produces the effect of substantially lowering the viscosity of the final product.

Dextrinization can be described as a complex degradation and rearrangement of starch under the influence of heat and acid. Specifically two reactions are predominant. Acide hydrolysis of the 1–4 and 1–6 glucose bonds results in a lower degree of polymerization, increased solubilization and decreased viscosity. As the concentration of fragments increases and the moisture content decreases, the second type of reaction begins to play an important part. This is recombination or the formation of new bonds. This results in a more ramified structure and ultimately can lead to increased viscosity. Other reactions which can take place are anhydro sugar formation and caramelizing. These latter reactions are particularly noticeable at high temperatures at very low moisture levels. Excess acid will usually hasten caramelization. Ordinarily the volatile acid and water are removed at such a rate during the roasting of starch that, during the first hour, the acid level has been reduced by ⅓ and the moisture from 7.5% to about 3.5%. The effect of this is to decrease the rate of hydrolysis and promote recombination. By the addition of acid and water during the early stages of the roast, a level of acid and moisture can be maintained which will promote hydrolysis, thus resulting in the low viscosity product. Extreme care must be exercised in the addition of acid and moisture. If they are added too soon, they are carried out of the roaster; if they are added too rapidly, mechanical troubles may be encountered such as spinning in the roaster or lump formation. If the acid is added after the moisture level has dropped below about 5.5%, black specking of the product may occur; and if the water is added too rapidly after the temperature has reached 210° F., fused lumps of residue may form.

The present invention includes the addition of acid and water to the starch during the roasting process when the starch temperature is between 190–225° F. and before the water content of the starch falls below about 5.5%. The amount of acid added is from about 40 to about 100% of the amount added to the starch initially. The amount of water added is about 4 to about 6 times by volume of the acid. (Based on the addition of 28% HCl.) When the roast time is 85–140 minutes, the acid and water normally are added from about 15–45 minutes after the start of the roast.

Normally white dextrins are made by roasting acidified starch of about 7.5% starting moisture for 2–6 hours at temperatures of 220–300° F. In the present invention, white dextrins of up to 100% solubles which make up into low viscosity high solubles adhesives are made by roasting acidified starch of about 7.5% moisture for about 85 to about 140 minutes at temperatures of 200–300° F. with the addition of water and acid during the roasting process. The improved products of the present invention are produced in substantially less time than heretofore.

The dextrins are made by utilizing starch of 6–9% moisture and having about 100 to 500 ml. of 28% HCl per 1000 lbs. starch added thereto, heating the same from about 200–300° F. for about 85–140 minutes, and adding about 0.05 to 0.5% water and about 40 to 500 ml. of 28% HCl per 1000 lbs. starch after roasting has begun. In a batch type steam jacketed roaster, the addition of acid and water is begun before the moisture content of the starch reaches 5.5% and before the temperature of the starch reaches 210° F. The time of addition is about 15–30 minutes after the roast starts.

With other types of roasters, acidic gases and water vapor can be added at a uniform rate during the roast. Other types of roasters may utilize other processing techniques, but the essential characteristic of the process is the step of renewing the acid and water content of the starch during the roast.

Whenever the terms solubles, percent solubles, or soluble solids are used in this application, the figure referred to was determined by the following procedure.

DEXTRIN SOLUBLES 10 grams of a dextrin sample is made up to 200 ml. in a 200 ml. volumetric flask by the addition of $H_2O$. The sample is then thoroughly mixed by shaking. The solids then are separated by filtration or by centrifuging the solution. An aliquot of the filtrate is then pipetted into a small beaker whose tare weight is known. The contents of the beaker are then evaporated on a steam bath and dried in an oven. When dry, the beaker is placed in a desiccator to cool and is then weighed.

Calculations:

Dry weight of the beaker and contents—

Tare weight of the beaker
Soluble solids in the dextrin $$\frac{\text{Soluble solids}}{\text{Sample weight}} \times 100 = \text{percent soluble in the dextrin}$$

For purposes of evaluation, the products of the examples hereinafter set forth are made up into standard case sealing type adhesives or are tested for degree of conversion by a standard control laboratory procedure. Standard Adhesive Formulation No. 1 is a conventional low viscosity adhesive, and Standard Adhesive Formulation No. 2 is a conventional high viscosity adhesive.

STANDARD ADHESIVE FORMULATION NO. 1 (LOW VISCOSITY)

| | Grams |
|---|---|
| Water | 330 |
| Dextrin (D.S.B.) | 242 |
| Borax decahydrate | 21 |
| Caustic (19% NaOH w./w.) | 20 |
| Formaldehyde | 1 |

The dextrin and water are mixed and heated with stirring to 190° F. The borax is added and mixed for 5 minutes. The adhesive is cooled to 145° F. and the caustic and the preservatives are added. The viscosity is measured with a Brookfield Viscometer Model LVF, at 12 r.p.m. using spindle No. 3 at 25° C.

STANDARD ADHESIVE FORMULATION NO. 2 (HIGH VISCOSITY)

| | Grams |
|---|---|
| Water | 223 |
| Dextrin (D.S.B.) | 228 |
| Borax decahydrate | 30 |
| Caustic (19% NaOH w./w.) | 12 |
| Preservative | 7 |

The same cooking procedure and test procedure are used as in Formulation No. 1, except that spindle No. 4 is used on the viscometer.

STANDARD CONTROL TEST

The standard flow viscosity is measured by timing the flow of a cooked paste through a tube. 200 grams of dextrin is cooked to 85° C. with 300 grams of water and 30 grams of borox pentahydrate. The paste is cooled to 25° C. and poured into a standard viscosity tube having an orifice diameter such that 100 ml. of water will flow through the tube in 13 seconds.

The following examples show specific processes for carrying out the present invention.

*Example I*

Two laboratory scale roasters are each charged with 1½ lbs. powdered starch (7.5% moisture) which has been acidified with 8.7 meq. aqueous HCl. The roasters are heated with heating mantles at a uniform rate so as to reach 290° F. in 2 hours. After 1 hour, 7 grams of water (absorbed on molecular sieves) and 4.4 meq. HCl (as absorbed on molecular sieves) are added to roaster No. 1. The reaction is stopped after 2 hours and the dextrin is cooled, screened and bagged in the usual manner. The viscosities of the adhesives (Standard Formulation No. 1) made from the products of the two roasts are 500 cp. for roaster No. 1 and 1100 cp. for roaster No. 2. The amount of solubles in the dextrin from roaster No. 1 is 99+% and in the dextrin from roaster No. 2 is 99+%.

*Example II*

A pilot plant scale roaster is charged with 20 lbs. of powdered starch which has been acidified with 116 meq. aqueous HCl. A cellophane dialysis bag filled with 90 ml. H$_2$O is attached to the agitator to permit the slow addition of moisture during the roasting period. The temperature of the starch is raised at a uniform rate to 290° F. over a period of 115 minutes. After 55 minutes has elapsed 58 meq. of HCl (as SOCl$_2$ absorbed on molecular sieves) is added to the roaster. The product is 100% soluble and has a viscosity of 350 cp. when made up in Standard Adhesive Formulation No. 1. A control batch made in the same roaster under the same conditions without the additional water and acid has a viscosity of 3800 when made up in Standard Adhesive Formulation No. 1. A control batch made in the same roaster in which additional acid (as SOCl$_2$ on molecular sieves) only is added has a viscosity of 2150 cp. when made up in Standard Adhesive Formulation No. 1

*Example III*

A pilot plant roaster is charged with 20 lbs. of powdered starch which has been acidified with 116 meq. aqueous HCl. The temperature of the starch is raised at a uniform rate to 290° F. over a period of 115 minutes. After 40 minutes has elapsed, 30 ml. of dil. HCl containing 19 meq. HCl is sprayed directly into the roaster. This is repeated after 50 minutes and 60 minutes for a total addition of 90 ml. of acid containing 58 meq. of HCl. The viscosity of a standard adhesive (Formulation No. 1) made up from this product is 850 cp.

*Example IV*

A large scale pilot plant roaster is charged with 200 lbs. of powdered starch which has been acidified with 500 ml. dil. HCl containing 875 meq. HCl. The temperature of the starch is raised to 275° F. over a period of 115 minutes. After 35 minutes has elapsed, 250 ml. of dil. HCl containing 437 meq. HCl is sprayed directly into the roaster during a 15 minute period. The product has a soluble content of 100%. The viscosity of the product as measured by the time required for a definite volume of cooked paste to flow through a standard orifice is 27 seconds. (The normal viscosity for a material prepared without the additional acid and water is 60 seconds.)

*Example V*

A plant dextrin roaster is loaded with 2000 lbs. of powdered starch which has been acidified with 7800 meq. of dil. HCl. The temperature of the starch is raised at the normal rate to a maximum of 280° F. over a period of 140 minutes. After 30 minutes has elapsed, 4375 meq. of HCl in 2500 ml. water is sprayed directly into the roaster over a 13 minute period. The flow viscosity of the product is 30 seconds.

*Example VI*

A produce similar to that of Example V is prepared by starting with 2000 lbs. of powdered starch acidified with 8750 meq. of dil. HCl. The second acidification is with 4375 meq. of HCl in 2500 ml. of water. This dextrin has a flow viscosity of 23 seconds.

*Example VII*

Four plant roasters each are charged with 2000 lbs. of powdered starch which has been acidified at the rate of 3062 meq. HCl per 1000 lbs. of starch. The four roasters are run simultaneously under uniform heating conditions as before. After 25 minutes has elapsed, 2500 ml. of dilute HCl containing 4375 meq. of HCl is sprayed into each roaster directly over a 23 minute period. The product obtained from blending the 4 roasters is 100% soluble and has a flow viscosity of 29 seconds.

*Example VIII*

A large scale pilot plant roaster is charged with 200 lbs. of powdered starch which has been acidified with 960 meq. of HCl in 550 ml. of dilute HCl. The starch is roasted as in Example VII. After 22 minutes has elapsed, 250 ml. of water is sprayed into the roaster over a 13 minute period. The product has a solubles content of 94%. The flow viscosity is 34 seconds. Adhesives made from this product are stable for short periods, but after 90 days are severely retrograded.

*Example IX*

A pilot plant scale roaster is charged with 20 lbs. of powdered starch which has been acidified with 175 meq. aqueous HCl. The normal draft is shut off and the temperature is raised according to the schedule of heating employed in Example II. After 40 minutes, droplets of water have formed on the lid and other cooler surfaces of the roaster. This results in the formation of hard balls of cooked starch degradation products. Black specks also are formed. The material is discharged after 90 minutes. About 20% of the product consists of lumps of fused residue. The remainder of the product is badly discolored.

*Example X*

A plant dextrin roaster is loaded with 2000 lbs. of powdered starch which has been acidified with 7800 meq. of dilute HCl. The temperature of the starch is raised at a scheduled rate to a maximum of 280° F. over a period of 2 hours. The product has a flow viscosity of 58 seconds.

The following tables show the products of the foregoing examples made up into typical adhesive formulations according to the formulations hereinbefore given, and shows the viscosities measures after 30, 60, and 90 day intervals.

STANDARD ADHESIVES FORMULATION NO. 1

| Dextrin | Treatment | Viscosity, cp. | | |
|---|---|---|---|---|
| | | Original | 30 days | 90 days |
| Example I | Acid and water | 500 | 500 | 525 |
| Example I | Control | 1,100 | 1,150 | 1,400 |
| Example II | Acid and water | 350 | 400 | 370 |
| Example II | Acid only | 2,150 | 2,050 | 2,800 |
| Example II | Control | 3,800 | 3,900 | 3,900 |
| Example III | Acid and water | 850 | 800 | 820 |
| Example X (Control) | Typical high solubles white dextrin. | 1,120 | 1,090 | 1,060 |

STANDARD ADHESIVES FORMULATION NO. 2

| Example IV | Acid and water | 4,000 | 3,700 | 3,900 |
|---|---|---|---|---|
| Example V | ...do... | 7,200 | 7,300 | 7,300 |
| Example VI | ...do... | 2,350 | 2,600 | 2,600 |
| Example VII | ...do... | 4,550 | 4,500 | 4,100 |
| Example VIII | All acid at start water added later. | 2,900 | 2,850 | 7,800 |
| Example X (Control) | Typical high solubles white dextrin. | 22,500 | 19,100 | 30,500 |

The foregoing tables show the striking reductions in viscosities of adhesives made from white dextrins produced by the process of the present invention as compared to similar adhesives made from white dextrins produced by conventional means.

The addition of the acid required by the present process may be made by dilute mineral acids, acid salts or reagents which liberate volatile acids. The time when the acid is added can be varied, however, the early addition of acid is less efficacious and addition of acid at high temperatures results in specking. Water can be added by use of inert hydrates, spraying, moist air, etc. but to be the most effective should be in a finely divided mist atomized directly into the roaster after about 20 to 40 minutes has elapsed. Care should be exercised in removing excess water which may tend to condense on the roaster's cooler surfaces and form hard lumps of fused material. Proper adjustment of the air flow through the roaster will accomplish this.

This invention is intended to cover all changes and modifications of the examples of the invention herein chosen for purposes of the disclosure which do not constitute departures from the spirit and scope of the invention.

What is claimed is:

1. A method of making a dextrin including the steps of heating an acidified starch having about 6–9% moisture, treating the starch with additional water and acid during the heating thereof after the starch has started to roast and before the water content drops substantially below about 5.5%, and recovering a dextrin having at least about 94% solubles and characterized by its paste having substantially less viscosity than similar paste made from a dextrin produced without the additional water and acid.

2. A method of making a dextrin including the steps of heating at a temperature of about 200–300° F. starch having about 6–9% moisture and the equivalent of about 100–500 milliliters of 28% HCl per 1000 lbs. starch, adding about 0.05%–0.5% moisture and the equivalent of about 40–500 milliliters of 28% HCl per 1000 lbs. starch thereto when the starch is at a temperature of about 190–225° F. and after the starch has started to roast and before the moisture content has dropped below about 5.5%, and recovering a high solubles white dextrin which, when pasted, has a low viscosity and is substantially non-retrograding.

3. A method of making a white high solubles dextrin including the steps of heating starch having about 6–9% moisture and the equivalent of about 100–500 milliliters of 28% HCl per 1000 lbs. starch at a temperature of about 200–300° F. for about 85–140 minutes, adding about 0.05%–0.5% moisture and the equivalent of about 40–500 milliliters of 28% HCl per 1000 lbs. starch to the starch before the moisture content falls below about 5.5% about 15–45 minutes after roasting of the starch has begun, and recovering a high solubles white dextrin characterized by its paste having substantially less viscosity and retrogradation than similar paste made from a dextrin produced without the additional added water and acid.

4. A method of making a dextrin including the steps of heating starch having about 6–9% moisture and equivalent of about 100–500 milliliters of 28% HCl per 1000 lbs. starch to a final temperature of about 200–300° F., adding additional water and acid to the starch during the roasting thereof, and recovering a white dextrin of greater than about 94% solubles which, when pasted, has a viscosity about 10–90% lower than a similar paste made from a dextrin produced without the added water and acid.

References Cited by the Examiner
UNITED STATES PATENTS

| | | | |
|---|---|---|---|
| 2,565,404 | 8/1951 | Staerkle et al. | 127—38 |
| 2,601,335 | 6/1952 | Slotter | 127—38 |
| 2,698,818 | 1/1955 | Staerkle et al. | 127—38 |
| 2,856,307 | 10/1958 | Fredrickson | 260—209 |

OTHER REFERENCES

Brautlecht: Starch, copyright 1953 by Reinhold Publishing Co., page 313 relied upon.

MORRIS O. WOLK, *Primary Examiner.*